(12) United States Patent
Miyazawa et al.

(10) Patent No.: US 9,969,869 B2
(45) Date of Patent: May 15, 2018

(54) POLYPROPYLENE-BASED RESIN COMPOSITION AND MOLDED ARTICLE MADE THEREOF

(71) Applicant: Sumitomo Chemical Company, Limited, Chuo-ku, Tokyo (JP)

(72) Inventors: Taro Miyazawa, Ichihara (JP); Susumu Kanzaki, Ichihara (JP); Tomomitsu Sekitani, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days. days.

(21) Appl. No.: 14/024,018

(22) Filed: Sep. 11, 2013

(65) Prior Publication Data

US 2014/0073730 A1 Mar. 13, 2014

(30) Foreign Application Priority Data

Sep. 13, 2012 (JP) ................................ 2012-201283

(51) Int. Cl.
| | |
|---|---|
| C08L 23/12 | (2006.01) |
| C08L 53/00 | (2006.01) |
| C08K 3/34 | (2006.01) |

(52) U.S. Cl.
CPC ............... *C08L 23/12* (2013.01); *C08L 53/00* (2013.01); *C08K 3/34* (2013.01); *C08L 2205/03* (2013.01)

(58) Field of Classification Search
CPC .......... C08L 23/12; C08L 23/16; C08L 23/18; C08L 53/00; C08L 2205/03; C08L 23/0815; C08L 2205/035; C08K 3/34
USPC ................................................. 524/451, 528
See application file for complete search history.

(56) References Cited

U.S. PATENT DOCUMENTS

| 6,441,081 B1* | 8/2002 | Sadatoshi | ........... C08F 297/083 |
| | | | 524/451 |
| 2003/0114579 A1* | 6/2003 | Mori | ....................... C08L 23/04 |
| | | | 524/515 |
| 2006/0058434 A1* | 3/2006 | Watanabe | ..................... 524/210 |
| 2006/0160941 A1* | 7/2006 | Kanzaki | ................ C08F 297/08 |
| | | | 524/451 |
| 2009/0253849 A1 | 10/2009 | Kanzaki et al. | |

FOREIGN PATENT DOCUMENTS

JP      H10-87919 A      4/1998

* cited by examiner

*Primary Examiner* — Josephine L Chang
(74) *Attorney, Agent, or Firm* — Panitch Schwarze Belisario & Nadel LLP

(57) ABSTRACT

A polypropylene-based resin composition capable of affording a molded article superior in tensile elongation at break includes a polypropylene resin (A), an ethylene-α-olefin copolymer (B) having a density of 0.865 to 0.890 g/cm$^3$, an ethylene-α-olefin copolymer (C) having a density of 0.855 to 0.859 g/cm$^3$, and an inorganic filler (D), wherein the content of the polypropylene resin (A) is 49 to 76% by weight, the content of the inorganic filler (D) is 9 to 22% by weight, the sum total of the contents of the ethylene-α-olefin copolymer (B) and the ethylene-α-olefin copolymer (C) is 15 to 29% by weight. The sum total of the contents of (A), (B), (C), and (D) is taken as 100% by weight, and the content of the ethylene-α-olefin copolymer (B), x % by weight, and the content of the ethylene-α-olefin copolymer (C), y % by weight, satisfy the formula: $0.07 \leq x/(x+y) \leq 0.41$.

4 Claims, No Drawings

US 9,969,869 B2

POLYPROPYLENE-BASED RESIN COMPOSITION AND MOLDED ARTICLE MADE THEREOF

BACKGROUND ART

1. Technical Field

The present invention relates to polypropylene-based resin compositions and molded articles made thereof. Particularly, it relates to a polypropylene-based resin composition from which a molded article superior in tensile elongation at break can be produced, and to a molded article made thereof superior in tensile elongation at break.

2. Related Art

Polypropylene-based resin compositions have heretofore been used in the form of molded articles such as automobile interior or exterior materials and electric component housings.

For example, in order to provide a polypropylene resin composition from which a stamping molded article easy to be removed from a mold can be produced, JP-A-10-87919 specifically discloses a polypropylene resin composition prepared by melt-blending a polypropylene, an ethylene-butene-1 copolymer rubber, an inorganic filler, and an organic peroxide, or a polypropylene resin composition prepared by melt-blending a polypropylene, an ethylene-octene-1 copolymer rubber, an inorganic filler, and an organic peroxide.

JP-A-2008-13757 discloses a polypropylene resin composition prepared by melt-blending a polypropylene, two ethylene-α-olefin copolymer rubbers, and an inorganic filler.

However, the attempt to use the polypropylene resin compositions disclosed in JP-A-10-87919 and JP-A-2008-13757 as an automotive exterior component has resulted in a molded article unsatisfactory in tensile elongation at break.

SUMMARY OF THE INVENTION

Under such circumstances, it is an object of the present invention to provide a polypropylene-based resin composition from which a molded article superior in tensile elongation at break can be produced, and a molded article made thereof superior in tensile elongation at break.

The present invention relates to a polypropylene-based resin composition comprising a polypropylene resin (A) defined below,
an ethylene-α-olefin copolymer (B) defined below,
an ethylene-α-olefin copolymer (C) defined below, and
an inorganic filler (D), wherein the content of the polypropylene resin (A) is 49 to 76% by weight, the content of the inorganic filler (D) is 9 to 22% by weight, the sum total of the contents of the ethylene-α-olefin copolymer (B) and the ethylene-α-olefin copolymer (C) is 15 to 29% by weight where the sum total of the contents of (A), (B), (C), and (D) is taken as 100% by weight, and where the content of the ethylene-α-olefin copolymer (B) is x % by weight and the content of the ethylene-α-olefin copolymer (C) is y % by weight, x and y satisfy the following formula (1), and to a molded article made thereof.

$$0.07 \leq x/(x+y) \leq 0.41 \tag{1}$$

The polypropylene resin (A) is a propylene-based block copolymer (A-1) comprising a propylene polymer portion (I) and a propylene random copolymer portion (II), or a propylene polymer mixture (A-3) comprising said block copolymer (A-1) and a propylene homopolymer (A-2), wherein the polymer portion (I) is contained in the block copolymer (A-1) in a content of 80 to 92% by weight and the random copolymer portion (II) is contained in the block copolymer (A-1) in a content of 8 to 20% by weight where the overall amount of the block copolymer (A-1) is taken as 100% by weight, the polymer portion (I) is a propylene polymer portion comprising 90% by weight or more of monomer units derived from propylene where the overall amount of the polymer portion (I) is taken as 100% by weight, the random copolymer portion (II) is composed of 11 to 70% by weight of monomer units derived from one or more olefins selected from the group consisting of ethylene and α-olefins having 4 or more carbon atoms, and 30 to 89% by weight of monomer units derived from propylene where the overall weight of the random copolymer portion (II) is taken as 100% by weight, wherein the intrinsic viscosity of the random copolymer portion (II) is 4.9 to 7.5 dl/g, the ethylene-α-olefin copolymer (B) is an ethylene-α-olefin copolymer having a density of 0.865 to 0.890 g/cm$^3$ and a melt mass flow rate of 1.5 to 30 g/10 minutes measured at a temperature of 230° C. and a load of 2.16 kg, the ethylene-α-olefin copolymer (C) is an ethylene-α-olefin copolymer having a density of 0.855 to 0.859 g/cm$^3$ and a melt mass flow rate of 2 to 5 g/10 minutes measured at a temperature of 230° C. and a load of 2.16 kg.

According to the present invention, there can be obtained a polypropylene-based resin composition from which a molded article superior in tensile elongation at break can be produced, and a molded article made thereof superior in tensile elongation at break.

DETAILED DESCRIPTION OF THE PREFERRED EMBODIMENTS

<Polypropylene Resin (A)>

The polypropylene resin (A) to be used for the present invention is a propylene-based block copolymer (A-1) comprising a propylene polymer portion (I) and a propylene random copolymer portion (II), or a propylene polymer mixture (A-3) comprising said block copolymer (A-1) and a propylene homopolymer (A-2).

When the polypropylene resin (A) to be used for the present invention is a propylene-based block copolymer (A-1) comprising a propylene polymer portion (I) and a propylene random copolymer portion (II), the polymer portion (I) contained in the block copolymer (A-1) is a propylene polymer portion comprising 90% by weight or more of monomer units derived from propylene where the overall amount of the polymer portion (I) is taken as 100% by weight. The propylene polymer portion (I) may comprise 10% by weight or less of monomer units derived from one or more olefins selected from ethylene and α-olefins having 4 or more carbon atoms. Preferably, the propylene polymer portion (I) is a propylene homopolymer portion.

When the propylene polymer portion (I) comprises 10% by weight or less of monomer units derived from one or more olefins selected from ethylene and α-olefins having 4 or more carbon atoms, the α-olefins having 4 or more carbon atoms to be used for monomer units derived from an α-olefin having 4 or more carbon atoms are preferably α-olefins having 4 to 10 carbon atoms, more preferably 1-butene, 1-pentene, 1-hexene, 4-methyl-1-heptene, 1-octene, and 1-decene, etc., and even more preferably 1-butene, 1-hexene, and 1-octene.

The content of the monomer units derived from propylene in the propylene polymer part (I) is 90% by weight or more, preferably 95% by weight or more, and more preferably 98% by weight or more where the overall amount of the propylene polymer part (I) is taken as 100% by weight. The content of the monomer units derived from propylene can be determined from a $^{13}$C-NMR spectrum of the propylene-based block copolymer (A-1).

From the viewpoint of improving the balance between the flowability of the polypropylene-based resin composition of the present invention exhibited when being melted and the toughness of a molded article made thereof, the intrinsic viscosity (HO of the propylene polymer portion (I) is preferably 0.75 to 0.82 dl/g, more preferably 0.75 to 0.80 dl/g.

An intrinsic viscosity can be determined by measuring reduced viscosities at three concentrations of 0.1 g/dl, 0.2 g/dl and 0.5 g/dl with a Ubbelohde viscometer, and then conducting a calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, an extrapolation method in which reduced viscosities are plotted against concentrations and the concentration is extrapolated in zero. The measurement is conducted at a temperature of 135° C. using Tetralin as a solvent.

The molecular weight distribution (Q value, Mw/Mn) of the propylene polymer portion (I) measured by gel permeation chromatography (GPC) is preferably 3 to 7, more preferably 3 to 5. Mw is the weight average molecular weight of the propylene polymer portion (I) and Mn is the number average molecular weight of the propylene polymer portion (I).

From the viewpoint of improving rigidity, heat resistance, or hardness, the isotactic pentad fraction of the propylene polymer portion (I) measured with $^{13}$C-NMR is preferably 0.97 or more, more preferably 0.98 or more.

The isotactic pentad fraction is a fraction of propylene monomer units which are present at the center of an isotactic chain in the form of a pentad unit, in other words, the center of a chain in which five propylene monomer units are meso-bonded successively, in the polypropylene molecular chain. The isotactic pentad fraction is determined by measuring an NMR absorption spectrum using the method disclosed by A. Zambelli et al. in Macromolecules 6, 925 (1973), namely, a method using $^{13}$C-NMR, and then assigning NMR absorption peaks according to Macromolecules, 8, 687 (1975).

The random copolymer portion (II) is a random copolymer portion composed of monomer units derived from one or more olefins selected from the group consisting of ethylene and α-olefins having 4 or more carbon atoms, and monomer units derived from propylene.

The content of the monomer units derived from one or more olefins selected from the group consisting of ethylene and α-olefins having 4 or more carbon atoms in the random copolymer portion (II) is 11 to 70% by weight, and from the viewpoint of achieving good balance between mechanical properties and tensile elongation at break, the content is preferably 35 to 48% by weight, more preferably 38 to 45% by weight. The content of the monomer units derived from propylene in the random copolymer portion (II) is 30 to 89% by weight, preferably 52 to 65% by weight, more preferably 55 to 62% by weight, where the overall amount of the random copolymer portion (II) is taken as 100% by weight.

The intrinsic viscosity ($[\eta]_{II}$) of the random copolymer portion (II) is 4.9 to 7.5 dl/g, and from the viewpoint of obtaining a molded article with no noticeable weld lines, no noticeable flow marks, and good appearance and from the viewpoint of obtaining a molded article having good balance between mechanical properties and tensile elongation at break, the intrinsic viscosity is preferably 5.7 to 7.2 dl/g, more preferably 6.0 to 7.2 dl/g.

The content of the propylene polymer portion (I) contained in the block copolymer (A-1) is 80 to 92% by weight and the content of the random copolymer portion (II) is 8 to 20% by weight where the overall amount of the block copolymer (A-1) is taken as 100% by weight. From the viewpoint of obtaining a molded article with good balance between mechanical properties and tensile elongation at break, the content of the polymer portion (I) is more preferably 82 to 92% by weight, even more preferably 84 to 92% by weight, and the content of the random copolymer portion (II) is more preferably 8 to 18% by weight, even more preferably 8 to 16% by weight.

When the polypropylene resin (A) to be used for the present invention is a propylene polymer mixture (A-3) comprising a propylene-based block copolymer (A-1) and a propylene homopolymer (A-2), the content of the block copolymer (A-1) contained in the propylene polymer mixture (A-3) is preferably 30 to 99% by weight, more preferably 45 to 90% by weight. The content of the propylene homopolymer (A-2) is preferably 1 to 70% by weight, more preferably 55 to 10% by weight where the overall amount of the propylene polymer mixture (A-3) is taken as 100% by weight.

The isotactic pentad fraction of the propylene homopolymer (A-2) to be used for the mixture (A-3) is preferably 97% or more, more preferably 98% or more.

The melt mass flow rate (henceforth referred to as MFR) of the propylene homopolymer (A-2) measured at a temperature of 230° C. and a load of 2.16 kg in accordance with JIS K7210 is usually 10 to 500 g/10 minutes, preferably 40 to 350 g/10 minutes.

From the viewpoint of improving the moldability of a polypropylene resin composition or the viewpoint of improving the impact resistance of a molded article, the MFR of the polypropylene resin (A) measured at a temperature of 230° C. and a load of 2.16 kg is preferably 10 to 120 g/10 minutes, more preferably 20 to 53 g/10 minutes. The MFR is measured in accordance with the method provided in JIS K7210.

Examples of a method for producing the propylene-based block copolymer (A-1) include a method comprising at least two stages of polymerization steps, wherein the propylene polymer portion (I) is produced in the first step and the random copolymer portion (II) is produced in the second step. Each of the polymer portions can be produced by the polymerization method described below using a catalyst system prepared by bringing (a) a solid catalyst component containing magnesium, titanium, halogen and electron donor as essential ingredients, (b) an organoaluminum compound, and (c) an electron-donating component into contact with each other. Examples of such a catalyst system and the method of its production include the catalyst systems and their production methods disclosed in JP-A 1-319508, JP-A 7-216017 and JP-A 10-212319.

Examples of the polymerization method include bulk polymerization, solution polymerization, slurry polymerization, and vapor phase polymerization. Such polymerization methods may be in a batch system or in a continuous system and may be combined appropriately. From the viewpoint of being more economically advantageous, vapor phase polymerization in a continuous system and bulk-vapor phase polymerization in a continuous system are preferred.

Specific examples of a method for producing the propylene-based block copolymer (A-1) include (1) a method using a polymerization reaction apparatus composed of two polymerization vessels configured in series, in which method the propylene polymer portion is produced in the first polymerization vessel in the presence of a catalyst system prepared by bringing said solid catalyst component (a), an organoaluminum compound (b), and an electron-donating component (c) into contact with each other, the propylene polymer portion produced in the first polymerization vessel is then transferred to the second polymerization vessel, and then the random copolymer portion is produced continuously in the second polymerization vessel, (2) a method using a polymerization reaction apparatus composed of three polymerization vessels configured in series, in which method the propylene polymer portion is produced in the first and second polymerization vessels in the presence of a catalyst system prepared by bringing said solid catalyst component (a), an organoaluminum compound (b), and an electron-donating component (c) into contact with each other, the propylene polymer portion produced in the second polymerization vessel is then transferred to the third polymerization vessel, and then the random copolymer portion is produced continuously in the third polymerization vessel, (3) a method using a polymerization reaction apparatus composed of four polymerization vessels configured in series, in which method the propylene polymer portion is produced in the first and second polymerization vessels in the presence of a catalyst system prepared by bringing said solid catalyst component (a), an organoaluminum compound (b), and an electron-donating component (c) into contact with each other, the propylene polymer portion produced in the second polymerization vessel is then transferred to the third polymerization vessel, and then the random copolymer portion is produced continuously in the third and fourth polymerization vessels, and (4) a method using a polymerization reaction apparatus composed of five polymerization vessels configured in series, in which method the propylene polymer portion is produced in the first and second polymerization vessels in the presence of a catalyst system prepared by bringing said solid catalyst component (a), an organoaluminum compound (b), and an electron-donating component (c) into contact with each other, the propylene polymer portion produced in the second polymerization vessel is then transferred to the third polymerization vessel, and then the random copolymer portion is produced continuously in the third to fifth polymerization vessels.

The amount of (a) the solid catalyst component, (b) the organoaluminum compound and (c) the electron donating component used in the aforementioned polymerization methods and the method for feeding the catalyst components into polymerization vessels may be determined appropriately on the basis of a method of use of a conventional catalyst.

The polymerization temperature is usually 20 to 300° C., preferably 20 to 180° C. The polymerization pressure is usually normal pressure to 10 MPa, preferably 0.2 to 5 MPa. Hydrogen, for example, may be used as a molecular weight regulator.

In the production of the propylene-based block copolymer (A-1), preliminary polymerization may be conducted via a method known in the art prior to main polymerization. One example of the preliminary polymerization method known in the art is a method in which preliminary polymerization is conducted in a slurry state using a solvent by feeding a small amount of propylene in the presence of (a) a solid catalyst component and (b) an organoaluminum compound.

Another method for producing the propylene-based block copolymer (A-1) is a method of producing it by blending a peroxide with a polymer prepared via a production method using the aforesaid catalyst system, and then melt-kneading them.

The intrinsic viscosity ($[\eta]_{II}$) of the propylene-ethylene random copolymer portion (II) contained in the block copolymer (A-1) produced by blending a peroxide with a polymer prepared via a production method using the aforesaid catalyst system, and then melt-kneading them can be determined by measuring the intrinsic viscosity of a 20° C. xylene-soluble components of the polymer resulting from the melt-kneading.

An organic peroxide is generally used as the peroxide, and examples of such an organic peroxide include alkyl peroxides, diacyl peroxides, peroxyesters, and peroxycarbonates.

Examples of the alkyl peroxides include dicumyl peroxide, di-tert-butyl peroxide, di-tert-butyl cumyl peroxide, 2,5-dimethyl-2,5-di(tert-butylperoxy)hexane, 2,5-dimethyl-2,5-di-(tert-butylperoxy)hexyne-3,1,3-bis(tert-butylperoxyisopropyl)benzene, and 3,6,9-triethyl-3,6,9-trimethyl-1,4,7-triperoxonane.

Examples of the diacyl peroxides include benzoyl peroxide, lauroyl peroxide, and decanoyl peroxide.

Examples of the peroxyesters include 1,1,3,3-tetramethylbutyl peroxyneodecanoate, α-cumyl peroxyneodecanoate, tert-butyl peroxyneodecanoate, tert-butyl peroxyneoheptanoate, tert-butyl peroxypivalate, tert-hexyl peroxypivalate, 1,1,3,3-tetramethylbutyl peroxy-2-ethylhexanoate, tert-amyl peroxyl-2-ethylhexanoate, tert-butyl peroxy-2-ethylhexanoate, tert-butyl peroxyisobutyrate, di-tert-butyl peroxyhexahydroterephthalate, tert-amyl peroxy-3,5,5-trimethylhexanoate, test-butyl peroxy-3,5,5-trimethyl hexanoate, tert-butyl peroxyacetate, tert-butyl peroxybenzoate, and di-tert-butyl peroxytrimethyladipate.

Examples of the peroxycarbonates include di-3-methoxybutyl peroxydicarbonate, di(2-ethylhexyl) peroxydicarbonate, diisopropyl peroxycarbonate, tert-butyl peroxyisopropylcarbonate, di(4-tert-butylcyclohexyl) peroxydicarbonate, dicetyl peroxydicarbonate, and dimyristyl peroxydicarbonate.

Examples of a method for producing the propylene homopolymer (A-2) may include the same methods as those for producing the propylene-based block copolymer (A-1), specifically methods using the catalyst system as that to be used for the production of the block copolymer (A-1).

<Ethylene-α-Olefin Copolymer (B)>

The ethylene-α-olefin copolymer (B) to be used for the present invention is an ethylene-α-olefin copolymer comprising monomer units derived from an α-olefin having 4 to 12 carbon atoms and monomer units derived from ethylene. Examples of the α-olefin having 4 to 12 carbon atoms include butene-1, pentene-1, hexene-1, heptene-1, octene-1, and decene; butene-1, hexene-1, and octene-1 are preferred, and octene-1 is more preferred.

From the viewpoint of improving impact strength, especially low-temperature impact strength, the content of the monomer units derived from an α-olefin contained in the ethylene-α-olefin copolymer (B) is preferably 20 to 50% by weight, more preferably 24 to 50% by weight where the overall amount of the ethylene-α-olefin copolymer (B) is taken as 100% by weight.

Examples of the ethylene-α-olefin copolymer (B) include an ethylene-butene-1 random copolymer, an ethylene-pentene-1 random copolymer, an ethylene-hexene-1 random copolymer, an ethylene-heptene-1 random copolymer, an ethylene-octene-1 random copolymer, and an ethylene-decene random copolymer; an ethylene-butene-1 random copolymer, an ethylene-hexene-1 random copolymer, and an ethylene-octene-1 random copolymer are preferred, and an ethylene-octene-1 random copolymer is more preferred. Two or more ethylene-α-olefin copolymers may be used in combination.

The density of the ethylene-α-olefin copolymer (B) is 0.865 to 0.890 g/cm$^3$, and from the viewpoint of improving the tensile elongation at break of a molded article and improving the balance between rigidity and impact resistance, the density is preferably 0.865 to 0.885 g/cm$^3$.

The MFR of the ethylene-α-olefin copolymer (B) measured at a temperature of 230° C. and a load of 2.16 kg in accordance with the regulation of HS K7210 is 1.5 to 30 g/10 minutes, and from the viewpoint of obtaining a molded article having no noticeable weld lines, no noticeable flow marks, and good appearance and the viewpoint of obtaining a molded article having good balance between rigidity and impact resistance, the MFR is preferably 1.5 to 25 g/10 minutes.

Examples of a method for producing the ethylene-α-olefin copolymer (B) include a method in which the copolymer is produced by copolymerizing ethylene with an α-olefin having 4 to 12 carbon atoms by using a catalyst and a polymerization method both known in the art.

Examples of the conventional catalyst include catalyst systems comprising vanadium compounds and organoaluminum compounds, Ziegler-Natta catalyst systems, and metallocene catalyst systems. Examples of the conventional polymerization method include solution polymerization slurry polymerization, high-pressure ion polymerization and vapor phase polymerization.

<Ethylene-α-Olefin Copolymer (C)>

The ethylene-α-olefin copolymer (C) to be used for the present invention is an ethylene-α-olefin copolymer comprising monomer units derived from an α-olefin having 4 to 12 carbon atoms and monomer units derived from ethylene. Examples of the α-olefin having 4 to 12 carbon atoms include butene-1, pentene-1, hexene-1, heptene-1, octene-1, and decene; butene-1, hexene-1, and octene-1 are preferred, and octene-1 is more preferred.

From the viewpoint of improving impact strength, especially low-temperature impact strength, the content of the monomer units derived from an α-olefin having 4 to 12 carbon atoms contained in the ethylene-α-olefin copolymer (C) is preferably 20 to 50% by weight, more preferably 24 to 50% by weight where the overall amount of the ethylene-α-olefin copolymer (C) is taken as 100% by weight.

Examples of the ethylene-α-olefin copolymer (C) include an ethylene-butene-1 random copolymer, an ethylene-hexene-1 random copolymer, and an ethylene-octene-1 random copolymer; an ethylene-octene-1 random copolymer, an ethylene-hexene-1 random copolymer, and an ethylene-butene-1 random copolymer are preferred, and an ethylene-octene-1 random copolymer is more preferred. Two or more ethylene-α-olefin copolymers may be used in combination.

The density of the ethylene-α-olefin copolymer (C) is 0.855 to 0.859 g/cm$^3$, and from the viewpoint of improving the tensile elongation at break of a molded article and improving the balance between rigidity and impact resistance, the density is preferably 0.855 to 0.858 g/cm$^3$.

The MFR of the ethylene-α-olefin copolymer (C) measured at a temperature of 230° C. and a load of 2.16 kg in accordance with the regulation of JIS K7210 is 2 to 5 g/10 minutes, and from the viewpoint of obtaining a molded article having good balance between rigidity and impact resistance, the MFR is preferably 2 to 4.5 g/10 minutes, more preferably 2 to 4 g/10 minutes.

Examples of a method for producing of the ethylene-α-olefin copolymer rubber (C) include the same production methods as those for producing the ethylene-α-olefin copolymer (B).

<Inorganic Filler (D)>

The inorganic filler (D) to be used for the present invention is usually a material to be used for improving the rigidity of a polypropylene-based resin composition, and examples thereof include calcium carbonate, barium sulfate, mica, crystalline calcium silicate, talc and fibrous magnesium sulfate; talc or fibrous magnesium sulfate is preferred, and talc is more preferred. Two or more of these inorganic fillers may be used in combination.

The talc to be used as the inorganic filler (D) is preferably hydrous magnesium silicate which has been ground. The crystal structure of the molecule of hydrous magnesium silicate is pyrophyllite-type three-layer structure. Talc is a compound composed of lamination of this structure. More preferred talc is one in a tabular form prepared by finely grinding crystals of a molecule of hydrous magnesium silicate crystals to a size almost as small as unit layers.

The average particle diameter of the talc is preferably not more than 3 µm. The average particle diameter of talc means a 50% equivalent particle diameter D50 which is determined from an integral distribution curve by the sub-sieve method which is measured by suspending it in a dispersing medium, such as water or alcohol, by use of a centrifugal sedimentation type particle size distribution analyzer.

The talc may be used either without being subjected to any treatment before use or with being treated on its surface with a conventional surfactant for the improvement in the interfacial adhesiveness with the polypropylene resin (A) or the dispersibility to the polypropylene resin (A). Examples of the surfactant include silane coupling agents, titanium coupling agents, higher fatty acids, higher fatty acid esters, higher fatty acid amides, and higher fatty acid salts.

The average fiber length of magnesium sulfate fiber to be used as the inorganic filler (D) is preferably from 5 to 50 µm, and more preferably from 10 to 30 µm. The average diameter of the magnesium sulfate fiber is preferably from 0.3 to 2 µm, and more preferably from 0.5 to 1 µm.

<Polypropylene-Based Resin Composition>

From the viewpoint of the rigidity and the impact strength of molded articles to be obtained, the content of the polypropylene resin (A) contained in the polypropylene-based resin composition of the present invention is 49 to 76% by weight, preferably 49 to 74% by weight, and more preferably 50 to 73% by weight where the sum total of the contents of (A), (B), (C) and (D) is taken as 100% by weight.

From the viewpoint of the tensile elongation at break, the impact strength, and the rigidity of molded articles to be obtained, the combined content of the ethylene-α-olefin copolymer (B) and the ethylene-α-olefin copolymer (C) contained in the polypropylene-based resin composition to be used for the present invention is 15 to 29% by weight, preferably 16 to 28% by weight where the sum total of the contents of (A), (B), (C), and (D) is taken as 100% by weight.

When the content of the ethylene-α-olefin copolymer (B) is denoted by x (% by weight) and the content of the ethylene-α-olefin copolymer (C) is denoted by y (% by weight), x and y satisfy the following formula (1), $$0.07 \leq x/(x+y) \leq 0.41 \tag{1}$$

The satisfaction of formula (1) results in molded articles superior in tensile elongation at break.

From the viewpoint of obtaining a molded article well balanced between mechanical properties and tensile elongation at break, the following formula (2) is preferably satisfied, and the following formula (3) is more preferably satisfied.

$$0.14 \leq x/(x+y) \leq 0.41 \tag{2}$$

$$0.18 \leq x/(x+y) \leq 0.41 \tag{3}$$

From the viewpoint of tensile elongation at break, flowability, and impact strength, the content of the ethylene-α-olefin copolymer (B) contained in the polypropylene-based resin composition of the present invention is preferably 1.5 to 9.5% by weight, more preferably 4 to 9% by weight where the sum total of the contents of (A), (B), (C), and (D) is taken as 100% by weight.

From the viewpoint of tensile elongation at break and rigidity, the content of the ethylene-α-olefin copolymer (C) contained in the polypropylene-based resin composition of the present invention is preferably 13 to 21% by weight, more preferably 13.5 to 18.5% by weight where the sum total of the contents of (A), (B), (C), and (D) is taken as 100% by weight.

From the viewpoint of the tensile elongation at break, the impact strength, and the rigidity of molded articles to be obtained, the content of the inorganic filler (D) contained in the polypropylene-based resin composition of the present invention is 9 to 22% by weight, preferably 10 to 22% by weight where the sum total of the contents of (A), (B), (C), and (D) is taken as 100% by weight.

The die swell (measured at a temperature of 220° C., L/D=40, and a shear rate of 2432 sec$^{-1}$) of the polypropylene-based resin composition of the present invention is preferably 1.25 to 1.42, more preferably 1.27 to 1.41 from the viewpoint of obtaining a molded article having no noticeable weld lines, no noticeable flow marks, and good appearance.

The polypropylene resin composition of the present invention can be produced by a method comprising melt-kneading its ingredients together, for example, a method using a kneading machine such as a single screw extruder, a twin screw extruder, a Banbury mixer, and a hot roll. The kneading temperature is usually from 170 to 250° C., and the kneading time is usually from 1 to 20 minutes. Kneading of the components may be performed either simultaneously or separately.

Examples of the method of kneading the ingredients separately include the following methods (1), (2), (3), and (4):

(1) a method in which a block copolymer (A-1) is kneaded and pelletized beforehand, and then the resulting pellets, a copolymer (B), a copolymer (C), and an inorganic filler are mixed and kneaded, (2) a method in which a block copolymer (A-1) is kneaded and pelletized beforehand, and then the resulting pellets, a propylene homopolymer (A-2), a copolymer (B), a copolymer (C), and an inorganic filler (D) are mixed and kneaded, (3) a method in which a block copolymer (A-1), a copolymer (B), and a copolymer (C) are kneaded, and then an inorganic filler (D) is added and kneaded, (4) a method in which a block copolymer (A-1) and an inorganic filler (D) are kneaded, and then a copolymer (B) and a copolymer (C) are added and kneaded.

In the method (3) or (4), a propylene homopolymer (A-2) may optionally be added.

To the polypropylene resin composition of the present invention, various additives may be added as necessary. Examples of such additives include antioxidants, UV absorbers, lubricants, pigments, antistatic agents, copper inhibitors, flame retarders, neutralizing agents, foaming agents, plasticizers, nucleating agents, foam inhibitors, crosslinking agents, etc. In order to improve heat resistance, weather resistance or oxidation resistance, addition of an antioxidant or UV absorber is preferred.

In order to further improve the balance of mechanical properties, a vinyl aromatic compound-containing rubber may be added to the polypropylene resin composition of the present invention.

Examples of the vinyl aromatic compound-containing rubber include block copolymers composed of a vinyl aromatic compound polymer block and a conjugated diene-based polymer block. The hydrogenation ratio of the double bonds of the conjugated diene moieties is preferably not less than 80% by weight, and more preferably not less than 85% by weight, where the overall amount of the double bonds contained in the conjugated diene moieties is 100% by weight.

The molecular weight distribution (Q value, Mw/Mn) of the vinyl aromatic compound-containing rubber measured by GPC (gel permeation chromatography) is preferably not more than 2.5, and more preferably from 1 to 2.3. Mw denotes the weight average molecular weight of the vinyl aromatic compound-containing rubber and Mn denotes the number average molecular weight of the aromatic compound-containing rubber.

The content of the vinyl aromatic compound contained in the vinyl aromatic compound-containing rubber is preferably from 10 to 20% by weight, and more preferably from 12 to 19% by weight where the overall weight of the vinyl aromatic compound-containing rubber is taken as 100% by weight.

The MFR of the vinyl aromatic compound-containing rubber measured at a temperature of 230° C. and a load of 2.16 kgf in accordance with MS K7120 is preferably 0.01 to 15 g/10 min, more preferably 0.03 to 13 g/10 min.

Examples of the vinyl aromatic compound-containing rubber include block copolymers such as styrene-ethylene-butene-styrene rubbers (SEBS), styrene-ethylene-propylene-styrene rubbers (SEPS), styrene-butadiene rubbers (SBR), styrene-butadiene-styrene rubbers (SBS) and styrene-isoprene-styrene rubbers (SIS), and hydrogenated block copolymers produced by hydrogenating these block copolymers. Moreover, rubbers produced by making a vinyl aromatic compound such as styrene react with an ethylene-propylene-nonconjugated diene rubber (EPDM) are also provided as examples. Two or more vinyl aromatic compound-containing rubbers may be used in combination.

The method for producing the vinyl aromatic compound-containing rubber is, for example, a method comprising linking a vinyl aromatic compound to an olefin-based copolymer rubber or a conjugated diene rubber by polymerization or reaction.

<Molded Article>

The molded article of the present invention is a molded article made of the polypropylene-based resin composition of the present invention. Examples of a method for forming the molded article of the present invention include such forming methods as injection molding, blow molding, press molding, vacuum molding, and extrusion forming.

The shape and the size of the molded article of the present invention may be determined appropriately depending upon the intended use of the molded article. Preferably, the molded article of the present invention is a molded article with a project area 2000 cm$^2$ or more.

Preferably, the molded article of the present invention is an injection molded article.

Preferably, the method for forming the injection molded article of the present invention is a method in which a polypropylene-based resin composition of the present invention is formed into a molded article by using an injection molding machine and a multi-gated mold.

Examples of an injection molding method include not only a normal injection molding method but also an injection foam molding method, a supercritical injection foam molding method, an ultra high speed injection molding process, an injection compression molding method, a gas assistant injection molding method, a sandwich injection molding method, and a film insertion injection molding method.

The polypropylene-based resin composition of the present invention and a molded article made therefrom are used for automobile interior or exterior parts and are used for door trims, pillars, instrument panels, and bumpers, for example. Preferred applications include automobile exterior parts, such as bumpers.

EXAMPLES

The present invention is described below with reference to Examples and Comparative Examples. The methods for measuring physical properties of the polymers and the compositions used in the Examples and the Comparative Examples are described below.

(1) Intrinsic Viscosity (Unit: dl/g)

A reduced viscosity was measured at three concentrations of 0.1 g/dl, 0.2 g/dl, and 0.5 g/dl, with an Ubbelohde viscometer. The intrinsic viscosity was calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), that is, by an extrapolation method by which reduced viscosities are plotted against concentrations and the concentration is extrapolated in zero. The measurement was carried out at a temperature of 135° C. using Tetralin as solvent.

(1-1) Intrinsic Viscosity of Propylene-Ethylene Block Copolymer (1-1-a) Intrinsic Viscosity of Propylene Homopolymer Portion (I): $[\eta]_I$ The intrinsic viscosity $[\eta]_I$ of a propylene homopolymer portion (I) contained in a propylene-ethylene block copolymer was determined by the method described in the above item (1) using some powder of the propylene homopolymer portion (I) taken out from a polymerization vessel just after the production of the propylene homopolymer portion by polymerization in the first step during the production of the propylene-ethylene block copolymer.

(1-1 b) Intrinsic Viscosity of Propylene-Ethylene Random Copolymer Portion (II): $[\eta]_{II}$ The intrinsic viscosity $[\eta]_{II}$ of a propylene-ethylene random copolymer portion (II) contained in a propylene-ethylene block copolymer was measured by measuring the intrinsic viscosity $[\eta]_I$ of a propylene homopolymer portion (I) and the intrinsic viscosity $[\eta]_T$ of the whole propylene-ethylene block copolymer, respectively, by the method of the above item (1), and then calculating the intrinsic viscosity $[\eta]_{II}$ from the following equation using the weight ratio X of the propylene-ethylene random copolymer portion (II) to the whole propylene-ethylene block copolymer. (The weight ratio X was determined by the measuring method (2) given below.)

$[\eta]_{II}=[\eta]_T/X-(1/X-1)[\eta]_I$ $[\eta]_I$: the intrinsic viscosity (dl/g) of the propylene homopolymer portion (I), $[\eta]_T$: the intrinsic viscosity (dl/g) of the whole propylene-ethylene block copolymer.

(2) Weight ratio X of the propylene-ethylene random copolymer portion (II) to the whole propylene-ethylene block copolymer, and ethylene content [(C2')II] of the propylene-ethylene random copolymer portion (II) contained in the propylene-ethylene block copolymer The weight ratio X and the ethylene content [(C2')II] were determined from a $^{13}$C-NMR spectrum measured under the following conditions in accordance with the report by Kakugo et al. disclosed in Macromolecules, 15, 1150-1152 (1982). In a test tube having a diameter of 10 mm, about 200 mg of a propylene-ethylene block copolymer was dissolved uniformly in 3 ml of o-dichlorobenzene to yield a sample solution, which was measured for its $^{13}$C-NMR spectrum under the following conditions:

measurement temperature: 135° C.
pulse repetition time: 10 seconds,
pulse width: 45°
transients: 2,500.

(3) Melt Mass Flow Rate (MFR; Unit: G/10 min)

Measurement was carried out in accordance with the method provided in JIS K7210. The measurement was performed at a temperature of 230° C. and a load of 2.16 kg.

(4) Isotactic Pentad Fraction ([mmmm])

The isotactic pentad fraction determined was a fraction of propylene monomer units which are present at the center of an isotactic chain in the form of a pentad unit (the isotactic chain is, in other words, a chain in which five propylene monomer units are meso-bonded successively) in the polypropylene molecular chain as measured by the method reported in A. Zambelli et al., Macromolecules, 6, 925 (1973), namely, by a method using $^{13}$C-NMR. NMR absorption peaks were assigned in accordance with the disclosure of Macromolecules, 8, 687 (1975). Specifically, an isotactic pentad fraction was obtained as an area fraction of mmmm peaks in the whole peak area of methyl carbon ranges of a $^{13}$C-NMR spectrum.

(5) Tensile Test (Tensile Elongation at Break (UE), Unit: %)

Measurement was carried out in accordance with the method provided in ISO 527-1. Using a specimen with a thickness 4 mm prepared via the molding method disclosed in the following section [Production of injection molded article], a tensile elongation at break (UE) was measured at a tensile rate 50 mm/min.

[Preparation of Injection Molded Article]

A specimen, which was an injection molded article, for the tensile test of the above (5) was produced by injection molding at a molding temperature of 200° C., a mold cooling temperature of 40° C., an injection time of 5 seconds, a pressure holding time of 40 seconds, and a cooling time of 8 seconds, by using an injection molding machine M70C manufactured by Meiki Co., Ltd.

The method for preparing the solid catalyst component (I) used for the production of the polymers in Examples and Comparative Examples is described below.

(1) Solid Catalyst Component (I)

A 200 liter cylindrical reactor (a reactor being 0.5 m in diameter equipped with a stirrer having three pairs of stirring blades being 0.35 m in diameter and four baffles being 0.05 m in width) was flushed with nitrogen, and charged with 54 l of hexane, 100 g of diisobutyl phthalate, 20.6 kg of tetraethoxysilane and 2.23 kg of tetrabutoxytitanium, followed by stirring. Subsequently, to the stirred mixture was dropped 51 liters of a solution of butylmagnesium chloride in dibutyl ether (concentration: 2.1 mol/l) over 4 hours while the temperature in the reactor was kept at 7° C. The stirring rate at this time was 150 rpm. After the completion of the dropping, the mixture was stirred at 20° C. for one hour and then filtered. The resulting solid was washed with 70 liters of toluene three times at room temperature, followed by the addition of toluene to give a slurry of a solid catalyst component precursor. The solid catalyst component precursor included Ti: 1.9% by weight, OEt (ethoxy group): 35.6% by weight, and OBu (butoxy group): 3.5% by weight. The average particle diameter was 39 and the amount of fine powder of 16 μm or less was 0.5% by weight. Subsequently, toluene was removed so that the volume of the slurry would become 49.7 liters, and the slurry was stirred at 80° C. for one hour. The slurry was then cooled to 40° C. or lower, and thereafter a mixed solution of 30 liters of tetrachlorotitanium and 1.16 kg of dibutyl ether was poured under stirring, followed by the addition of 4.23 kg of orthophthaloyl dichloride. The temperature in the reactor was adjusted to 110° C. and stirring was conducted for 3 hours, followed by filtration. The solid collected was washed with 90 liters of toluene three times at 95° C. Toluene was added to form a slurry. After leaving at rest, toluene was extracted so that the slurry volume would become 49.7 liters and subsequently, a mixed solution of 15 liters of tetrachlorotitanium, 1.16 kg of dibutyl ether and 0.87 kg of diisobutyl phthalate was poured thereto under stirring. The temperature in the reactor was adjusted to 105° C. and stirring was conducted for one hour, followed by filtration. The solid collected was washed with 90 liters of toluene twice at 95° C. Toluene was added to form a slurry. After leaving at rest, toluene was extracted so that the slurry volume would become 49.7 liters. Subsequently, a mixed solution of 15 liters of tetrachlorotitanium and 1.16 kg of dibutyl ether was poured thereto under stirring. The temperature in the reactor was adjusted to 105° C. and stirring was conducted for one hour, followed by filtration. The solid collected was washed with 90 liters of toluene twice at 95° C. Toluene was added to form a slurry. After leaving at rest, toluene was extracted so that the slurry volume would become 49.7 liters. Subsequently, a mixed solution of 15 liters of tetrachlorotitanium and 1.16 kg of dibutyl ether was poured thereto under stirring. The temperature in the reactor was adjusted to 105° C. and stirring was conducted for one hours, followed by filtration. The solid collected was washed at 95° C. with 90 liters of toluene three times and with 90 liters of hexane twice. The resulting solid component was dried, yielding a solid catalyst component. The solid catalyst component contained 2.1% by weight of Ti and 10.8% by weight of phthalate component. This solid catalyst component is hereafter called "solid catalyst component (I)."

[Materials Used]

(1) Propylene-Ethylene Block Copolymer (BCPP) (A-1)

BCPP-1: a propylene-ethylene block copolymer that was obtained via the method described below and has the physical properties shown in Table 1.

(1-1) Production of Powder of BCPP-1

Using the solid catalyst component (I), a propylene homopolymer portion was produced in a first stage, and then a propylene-ethylene random copolymer portion was produced in a second stage via a two-stage vapor phase polymerization process continuously. In the first stage, the hydrogen concentration and the polymerization in the system were controlled. In the second stage, propylene was fed continuously so that the reaction temperature and the reaction pressure would be kept constant, and the production of the propylene-ethylene random copolymer portion was continued while hydrogen and ethylene were fed so that the hydrogen concentration in the vapor phase and the ethylene content in the vapor phase would be kept constant. Thus, a powder of the propylene-ethylene block copolymer was obtained.

(1-2) Production of Pellets of BCPP-1

To 100 parts by weight of the powder of BCPP-1 were added 0.05 parts by weight of calcium stearate (produced by NOF Corp.), 0.50 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane (SUMILIZER GA80, produced by Sumitomo Chemical Co., Ltd.) and 0.50 parts by weight of bis(2,4-di-tert-butylphenyl) pentaerythritol diphosphite (ULTRANOX U626, produced by GE Specialty Chemicals) as stabilizers, followed by pelletization with an extruder. Thus, pellets of BCPP-1 were obtained.

(2) Ethylene-α-Olefin Copolymer (B)

EOR-1: an ethylene-octene-1 random copolymer having the following physical properties.

Density: 0.870 g/cm$^3$

MFR (230° C., 2.16 kg load): 2.3 g/10 min (3) Ethylene-α-Olefin Copolymer (C)

EOR-2: an ethylene-octene-1 random copolymer having the following physical properties.

Density: 0.857 g/cm$^3$

MFR (230° C., 2.16 kg load): 2.7 g/10 min (4) Inorganic Filler (D)

Talc 1: talc with an average particle diameter (D50) of 2.1 μm

Example 1

BCPP-1 pellets as a polypropylene resin (A), EOR-1 as an ethylene-α-olefin copolymer (B), EOR-2 as an ethylene-α-olefin copolymer (C), and talc-1 as an inorganic filler (D) were compounded in composition proportions 56.5% by weight, 2.5% by weight, 20% by weight, and 21% by weight, respectively and then were preliminarily mixed with a tumbler uniformly. The resulting mixture was kneaded and extruded at an extrusion rate 50 kg/hr, 230° C., and a screw rotation speed 350 rpm by using a twin screw kneading extruder (manufactured by Japan Steel Works, Ltd., TEX44SS-30BW-2V). Thus, a polypropylene-based resin composition was produced. The evaluated results of the MFR of the resulting polypropylene-based resin composition and the physical properties of an injection molded article are shown in Table 2.

Example 2

Pellets of BCPP-1, a powder of BCPP-1 both as a polypropylene resin (A), EOR-1 as an ethylene-α-olefin copolymer (B), EOR-2 as an ethylene-α-olefin copolymer (C), and talc-1 as an inorganic filler (D) were compounded in composition proportions 51.5% by weight, 5% by weight (56.5% by weight of BCPP-1 in total), 5% by weight, 17.5% by weight, and 21% by weight, respectively, and then preliminarily mixed and kneaded in the same manner as in Example 1. Thus, a polypropylene-based resin composition was produced. The MFR of the resulting polypropylene-based resin and the physical properties of an injection molded article were measured. The evaluated results are shown in Table 2.

Example 3

Pellets of BCPP-1, a powder of BCPP-1 both as a polypropylene resin (A), EOR-1 as an ethylene-α-olefin copolymer (B), EOR-2 as an ethylene-α-olefin copolymer (C), and talc-1 as an inorganic filler (D) were compounded in composition proportions 51.5% by weight, 5% by weight (56.5% by weight of BCPP-1 in total), 8% by weight, 14.5% by weight, and 21% by weight, respectively, and then preliminarily mixed and kneaded in the same manner as in Example 1. Thus, a polypropylene-based resin composition was produced. The MFR of the resulting polypropylene-based resin and the physical properties of an injection molded article were measured. The evaluated results are shown in Table 2.

Comparative Example 1

BCPP-1 pellets, EOR-1 as an ethylene-α-olefin copolymer rubber (B), EOR-2 as an ethylene-α-olefin copolymer (C), and talc-1 as an inorganic filler (D) were compounded in composition proportions 56.5% by weight, 1% by weight, 21.5% by weight, and 21% by weight, respectively, and then preliminarily mixed and kneaded in the same manner as in Example 1. Thus, a polypropylene-based resin composition was produced. The MFR of the resulting polypropylene-based resin and the physical properties of an injection molded article were measured. The evaluated results are shown in Table 2.

Comparative Example 2

BCPP-1 pellets, EOR-1 as an ethylene-α-olefin copolymer (B), EOR-2 as an ethylene-α-olefin copolymer (C), and talc-1 as an inorganic filler (D) were compounded in composition proportions 56.5% by weight, 9.5% by weight, 13% by weight, and 21% by weight, respectively, and then preliminarily mixed and kneaded in the same manner as in Example 1. Thus, a polypropylene-based resin composition was produced. The MFR of the resulting polypropylene-based resin and the physical properties of an injection molded article were measured. The evaluated results are shown in Table 2.

TABLE 1

Propylene-ethylene block copolymer

|  |  | Propylene-ethylene block copolymer BCPP-1 |
|---|---|---|
| Content of random copolymer portion | % by weight | 10 |
| $[\eta]_I$ | dl/g | 0.80 |
| $[\eta]_{II}$ | dl/g | 6.7 |
| $[\eta]_T$ | dl/g | 1.64 |
| [(C2')II] | % by weight | 40 |
| MFR | g/10 minutes | 88 |
| [mmmm] |  | 0.991 |

TABLE 2

|  |  | Example | | | Comparative Example | |
|---|---|---|---|---|---|---|
|  |  | 1 | 2 | 3 | 1 | 2 |
| BCPP-1 | % by weight | 56.5 | 56.5 | 56.5 | 56.5 | 56.5 |
| EOR-1 | % by weight | 2.5 | 5 | 8 | 1 | 9.5 |
| EOR-2 | % by weight | 20 | 17.5 | 14.5 | 21.5 | 13 |
| x/(x + y) |  | 0.11 | 0.22 | 0.36 | 0.04 | 0.42 |
| Talc-1 | % by weight | 21 | 21 | 21 | 21 | 21 |
| MFR | g/10 minutes | 34.5 | 34.5 | 36 | 34.7 | 34.6 |
| Tensile elongation at break | % | 77 | 75 | 72 | 66 | 67 |

The polypropylene-based resin compositions and the molded articles made thereof of Example 1, Example 2, and Example 3 are confirmed to be superior in tensile elongation at break.

Comparative Example 1 and Comparative Example 2 are confirmed to be insufficient in tensile elongation at break because the relationship between the weight x of the ethylene-α-olefin copolymer rubber (B) and the weight y of the ethylene-α-olefin copolymer rubber (C) does not satisfy $0.07 \leq x/(x+y) \leq 0.41$.

What is claimed is:

1. A polypropylene-based resin composition comprising a polypropylene resin (A) defined below,
an ethylene-α-olefin copolymer (B) defined below,
an ethylene-octene-1 copolymer (C) defined below, and
an inorganic filler (D),
   wherein the content of the polypropylene resin (A) is 49 to 76% by weight, the content of the inorganic filler (D) is 9 to 22% by weight, the sum total of the contents of the ethylene-α-olefin copolymer (B) and the ethylene-octene-1 copolymer (C) is 15 to 29% by weight where the sum total of the contents of (A), (B), (C), and (D) is taken as 100% by weight, and
where the content of the ethylene-α-olefin copolymer (B) is x % by weight and the content of the ethylene-octene-1 copolymer (C) is y % by weight, x and y satisfy the following formula (1)

$$0.07 \leq x/(x+y) \leq 0.41 \quad (1)$$

the polypropylene resin (A) comprises a propylene-based block copolymer (A-1) comprising a propylene polymer portion (I) and a propylene random copolymer portion (II) and optionally a propylene homopolymer (A-2),
wherein
the polymer portion (I) is contained in the block copolymer (A-1) in a content of 80 to 92% by weight and the random copolymer portion (II) is contained in the block copolymer (A-1) in a content of 8 to 20% by weight where the overall amount of the block copolymer (A-1) is taken as 100% by weight,
the polymer portion (I) is a propylene polymer portion having an intrinsic viscosity $[\eta]_I$ of 0.75 to 0.82 dl/g and comprising 90% by weight or more of monomer units derived from propylene where the overall amount of the polymer portion (I) is taken as 100% by weight,
the random copolymer portion (II) is composed of 35 to 48% by weight of monomer units derived from ethylene, and 52 to 65% by weight of monomer units derived from propylene where the overall weight of the random copolymer portion (II) is taken as 100% by weight, wherein the intrinsic viscosity of the random copolymer portion (II) is 4.9 to 7.5 dl/g, the ethylene-α-olefin copolymer (B) has a density of 0.865 to 0.890 g/cm³ and a melt mass flow rate of 1.5 to 2.3 g/10 minutes measured at a temperature of 230° C. and a load of 2.16 kg, the ethylene-octene-1 copolymer (C) has a density of 0.855 to 0.859 g/cm³ and a melt mass flow rate of 2 to 5 g/10 minutes measured at a temperature of 230° C. and a load of 2.16 kg, and wherein the content of the monomer units derived from octene-1 is 20 to 50% by weight, wherein the inorganic filler (D) is talc.

2. The polypropylene-based resin composition according to claim 1, wherein the ethylene-α-olefin copolymer (B) and the ethylene-octene-1 copolymer (C) are each an ethylene-octene-1 random copolymer.

3. The propylene-based resin composition according to claim 1, wherein x and y satisfy the following formula (2):

$$0.07 \leq x/(x+y) \leq 0.36 \qquad (2).$$

4. A molded article made of a polypropylene-based resin composition according to claim 1.

* * * * *